(12) United States Patent
Coulas et al.

(10) Patent No.: US 10,165,484 B2
(45) Date of Patent: *Dec. 25, 2018

(54) SIP HEADER TO INDICATE MOBILITY TRANSFER OPERATION

(71) Applicant: Google Technology Holdings LLC, Mountain View, CA (US)

(72) Inventors: Michael F. Coulas, Buffalo Grove, IL (US); Apostolis K. Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/069,427

(22) Filed: Mar. 14, 2016

(65) Prior Publication Data

US 2016/0198380 A1    Jul. 7, 2016

Related U.S. Application Data

(63) Continuation of application No. 12/935,144, filed as application No. PCT/US2009/038058 on Mar. 24, 2009, now Pat. No. 9,319,434.

(30) Foreign Application Priority Data

Mar. 31, 2008   (EP) ..................... 08386004

(51) Int. Cl.
*H04W 36/14* (2009.01)
*H04L 29/06* (2006.01)
(Continued)

(52) U.S. Cl.
CPC ....... *H04W 36/14* (2013.01); *H04L 29/08072* (2013.01); *H04L 61/1529* (2013.01);
(Continued)

(58) Field of Classification Search
CPC ............. H04W 36/14; H04L 61/1529; H04L 29/08072; H04L 69/22; H04L 65/1083; H04L 65/1016; H04L 65/1006
See application file for complete search history.

(56) References Cited

U.S. PATENT DOCUMENTS

2006/0149847 A1 * 7/2006 Meskauskas ....... H04L 65/1016
                                                                  709/229
2006/0225108 A1   10/2006 Tabassi et al.
(Continued)

FOREIGN PATENT DOCUMENTS

EP                1821488 A1        12/1899
WO          WO/2008/088891          12/1899

OTHER PUBLICATIONS

3rd Generation Partnership Project, "Change Request: UE and Network Behaviour During Domain Transfer", Technical Report, 3GPP TSG-SA WG2 Meeting #56, Mar. 26-Mar. 30, 2007, pp. 1-5.

(Continued)

*Primary Examiner* — Dady Chery
(74) *Attorney, Agent, or Firm* — Byrne Poh LLP

(57) ABSTRACT

A method (500) of indicating a process to be implemented in support of a mobility transfer operation and a method (600) of responding to a mobility transfer operation being initiated. A session initiation protocol (SIP) request (120, 124, 128, 220, 226, 228) can be generated. The SIP request can indicate a mobility transfer type that corresponds to the mobility transfer operation. The SIP request can be sent from a first device (102, 106) participating in the mobility transfer operation to at least a second device (106, 102) participating in the mobility transfer operation.

17 Claims, 4 Drawing Sheets

(51) Int. Cl.
*H04L 29/08* (2006.01)
*H04L 29/12* (2006.01)

(52) U.S. Cl.
CPC ...... *H04L 65/1006* (2013.01); *H04L 65/1016* (2013.01); *H04L 65/1083* (2013.01); *H04L 69/22* (2013.01)

(56) References Cited

U.S. PATENT DOCUMENTS

| | | | |
|---|---|---|---|
| 2007/0280453 | A1 | 12/2007 | Kelley et al. |
| 2008/0032695 | A1 | 2/2008 | Zhu et al. |
| 2009/0190577 | A1* | 7/2009 | Allen ............... H04L 65/1016 370/352 |
| 2009/0245180 | A1 | 10/2009 | Wu |
| 2010/0017777 | A1* | 1/2010 | Zeidman ............ G06F 17/505 716/104 |
| 2010/0107205 | A1 | 4/2010 | Foti |
| 2015/0341394 | A1* | 11/2015 | Shaikh ............... H04W 28/06 370/352 |
| 2016/0198380 | A1* | 7/2016 | Coulas ............... H04L 65/1016 370/352 |

OTHER PUBLICATIONS

3rd Generation Partnership Project, "Technical Specfication Group Services and Systems Aspects; IP Mutlimedia Systems (IMS) centralized services", Technical Report, 3GPP TR 23.982 v0.31, Mar. 8, 2007, pp. 1-18.
3rd Generation Partnership Project, "Technical Specification Group Core Network and Terminals; Voice Call Continuity between the Circuit-Switched domain and the IP multimedia Core Network subsystem; Stage 3", Technical Report, 3GPP TS 24.206 v7.40.0, Dec. 2007, pp. 1-123.
3rd Generation Partnership Project, "Technical Specification Group Services and Architecture, Feasiblity Study on Multimedia Session Continuity; Stage 2", Techinical Report, 3GPP TR 23.893 v1.0.0, Dec. 2012, pp. 1-52.
3rd Generation Partnership Project, "Technical Specification Group Services and System Aspects; Voice Call Continuity Between Circuit Switched and IP Multimedia Subsystem; Stage 2", Technical Report, 3GPP TS 23.206, Dec. 2007, pp. 1-36.
Chahbour et al., "Fast Handoff for Heirarchical Mobile SIP Networks", World Academy of Science, Engineering and Technology, vol. 5, Apr. 2005, pp. 1-5.
International Preliminary Report on Patentability dated Oct. 5, 2010 in International Patent Application No. PCT/US2009/038058, pp. 34-37.
International Search Report dated Jun. 22, 2009 in International Patent Application No. PCT/US2009/038058.
Mahy, R. et al., "The Session Initiation Protocol (SIP) 'Replaces' Header", network Working Group, Request for Comments: 3891, Sep. 2004, pp. 1-16.
Office Action dated Mar. 13, 2014 in U.S. Appl. No. 12/935,144.
Office Action dated Apr. 20, 2015 in U.S. Appl. No. 12/935,144.
Office Action dated Jul. 23, 2014 in U.S. Appl. No. 12/935,144.
Schulzrinne et al., "Application Layer Mobility Using SIP", In Mobile Computing and Communication Review, vol. 4, No. 3, 2000, pp. 1-9.
Schulzrinne, H. et al., "The Reason Header Field for the Session Initiation Protocol (SIP)", In Network Working Group, Request for Comments: 3326, Dec. 2002, pp. 1-8.
Written Opinion of the International Search Authority dated Jun. 22, 2009 in International Patent Application No. PCT/US2009/038058.
Extended European Search Report dated Aug. 27, 2008 in European Patent Application No. 08386004.9.

* cited by examiner

500

┌─────────────────────────────────────────────────────────┐
│ Detect a mobility transfer operation has been initiated │
│                                                     502 │
└─────────────────────────────────────────────────────────┘
                            │
                            ▼
┌─────────────────────────────────────────────────────────┐
│ Generate a SIP request that indicates a mobility transfer type that │
│ corresponds to the mobility transfer operation          │
│                                                     504 │
└─────────────────────────────────────────────────────────┘
                            │
                            ▼
┌─────────────────────────────────────────────────────────┐
│ Send the SIP request from a first device participating in the mobility │
│ transfer operation to at least a second device participating in the │
│ mobility transfer operation                             │
│                                                     506 │
└─────────────────────────────────────────────────────────┘

┌─────────────────────────────────────────────────────────┐
│ Receive from a device participating in the mobile transfer operation a │
│ SIP request that indicates a mobility transfer type that corresponds to │
│ the mobility transfer operation                         │
│                                                     602 │
└─────────────────────────────────────────────────────────┘
                            │
                            ▼
┌─────────────────────────────────────────────────────────┐
│ Identify a process that corresponds to the mobility transfer type │
│                                                     604 │
└─────────────────────────────────────────────────────────┘
                            │
                            ▼
┌─────────────────────────────────────────────────────────┐
│ Implement the identified process                        │
│                                                     606 │
└─────────────────────────────────────────────────────────┘

FIG. 6

SIP HEADER TO INDICATE MOBILITY TRANSFER OPERATION

CROSS-REFERENCE TO RELATED APPLICATIONS

This application is a continuation of U.S. patent application Ser. No. 12/935,144, filed Sep. 28, 2010, which is the U.S. National Phase Application under 35 U.S.C. § 371 of International Patent Application No. PCT/US2009/038058, filed Mar. 24, 2009, which claims the benefit of European Patent Application No. 08386004.9, filed Mar. 31, 2008, which are hereby incorporated by reference herein in their entireties.

FIELD OF THE INVENTION

The present invention generally relates to mobile communications and, more particularly, to mobile communication protocols.

BACKGROUND OF THE INVENTION

Session Initiation Protocol (SIP) is an application-layer signaling protocol for creating, modifying, and terminating communication sessions with one or more participants. SIP operates independently from an underlying transport layer, and thus can be used with a variety of transport protocols. As such, SIP has gained wide acceptance in recent years and now is commonly used in a variety of communication systems, including those that support mobile communications.

In a typical mobile communication scenario, for example when a mobile communication device (mobile device) is moving while being used, the mobile device may roam from an area serviced by a first communication network (first network) that is SIP based to an area serviced by a second communication network (second network) that is also SIP based or is circuit-switched (CS). When this occurs during a call, a new communication segment needs to be established in the second network before the original communication segment with the first network is released.

The release of the original communication segment is typically initiated by communicating a notification to the mobile device via the first network to indicate to the mobile device that the original communication segment is being released. Unfortunately, if the mobile device loses connectivity to the first network before receiving such notification, the mobile device cannot immediately release the original communication segment in a conventional manner. An attempt to do so may be interpreted by the communication network as a release of the communication session.

SUMMARY OF THE INVENTION

The present invention relates to a method of indicating a process to be implemented in support of a mobility transfer operation. The method can include generating a session initiation protocol (SIP) request that indicates a mobility transfer type that corresponds to the mobility transfer operation. The SIP request can be generated in response to detecting that the mobility transfer operation has been initiated. The SIP request can be sent from a first device participating in the mobility transfer operation to at least a second device participating in the mobility transfer operation.

Another aspect of the inventive arrangements relates to a method of responding to a mobility transfer operation being initiated. Such method can include receiving from a device participating in the mobility transfer operation a SIP request that indicates a mobility transfer type that corresponds to the mobility transfer operation. Further, a process that corresponds to the mobility transfer type can be identified, and the identified process can be implemented.

The present invention also relates to a communication device that participates in a mobility transfer operation. The device can include a processor that, responsive to detecting that the mobility transfer operation has been initiated, generates a SIP request that indicates a mobility transfer type that corresponds to the mobility transfer operation. The communication device also can include a communication adapter that sends the SIP request to at least a second device participating in the mobility transfer operation.

Another aspect of the inventive arrangements relates to a communication device participating in a mobility transfer operation. The communication device can include a communication adapter that receives from a second device participating in the mobility transfer operation a SIP request that indicates a mobility transfer type that corresponds to the mobility transfer operation. The communication device also can include a processor that identifies a process that corresponds to the mobility transfer type and implements the identified process.

BRIEF DESCRIPTION OF THE DRAWINGS

Preferred embodiments of the present invention will be described below in more detail, with reference to the accompanying drawings, in which:

FIG. 5 is a flowchart presenting a method of supporting a mobility transfer operation, which is useful for understanding the present invention; and FIG. 6 is a flowchart presenting a method of responding to a mobility transfer operation being initiated, which is useful for understanding the present invention.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Arrangements described herein relate to the use of session initiation protocol (SIP) requests which are configured to improve the manner in which mobility transfer operations are performed, for example when a client device roams from one communication network to another during a communication session, or when an active communication session is transferred from one device to another. More particularly, an indicator of a mobility transfer type can be included within a SIP request, for instance within the header of a SIP request, to indicate the type of mobility transfer operation being performed. A device receiving such a SIP request can select an appropriate action to be implemented based on the mobility transfer type indicator.

Figure 1:
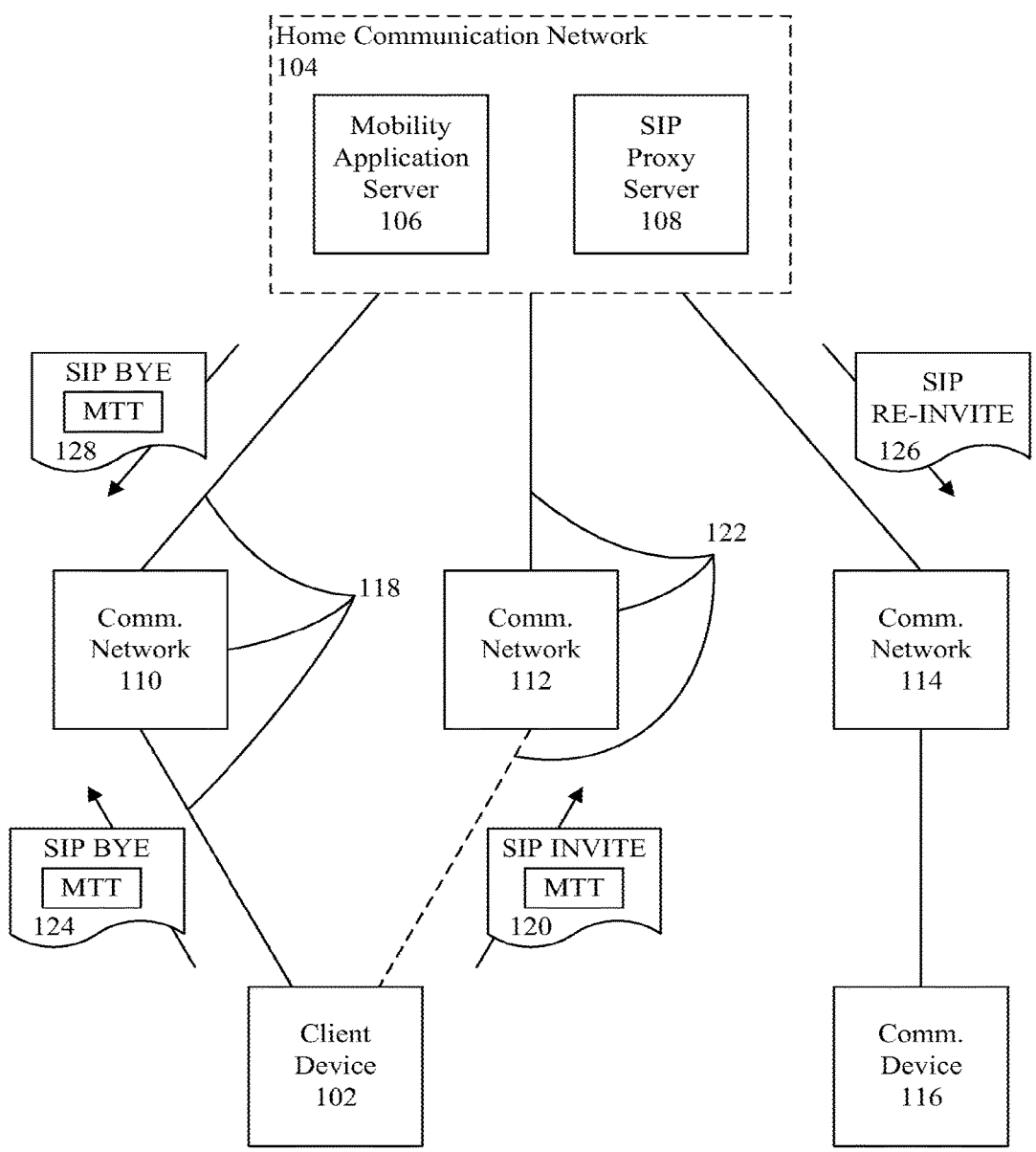
FIG. 1 depicts a communication system that is useful for understanding the present invention.

FIG. 1 depicts a communication system 100 useful for understanding the present invention. Within the communication system 100, voice call continuity transfer and/or session mobility may be implemented. A voice call continuity transfer is a transfer of a communication session from a communication network administered under a first protocol to another communication network administered under a different protocol. With session mobility, the same protocol is used to administer both the communication network from which the communication session is transferred and the communication network receiving the transfer.

The communication system 100 can be configured in accordance with applicable communication and air interface standards. Examples of such standards include, but are not limited to, Institute of Electrical and Electronics Engineers (IEEE) 802 wireless communications, for example, 802.11 and 802.16, standards proposed by the Open Mobile Alliance (OMA), the 3rd Generation Partnership Project (3GPP), and/or the 3rd Generation Partnership Project 2 (3GPP2). The communications system 100 also can implement any of a variety of communication protocols including, but not limited to, GSM, TDMA, CDMA, WCDMA, OFDM, etc. Moreover, the communication system 100 can include any of a variety of suitable data links including, but not limited to, circuit-switched and packet-switched data links. Modifications or deviations from the standards and/or protocols can be made to suitably implement the present invention.

The communication system 100 also can include a client device 102, which can be any mobile communication device suitably configured to communicate messages in accordance with SIP. Examples of such mobile communication devices include, but are not limited to, a mobile telephone, a mobile radio, a personal digital assistant, a mobile computer, a mobile station, or the like. In that regard, the client device 102 can communicate via wired and/or wireless communications.

The client device 102 can be associated with a home communication network 104, which may include a mobility application server 106 that manages mobility operations for the client device 102. For instance, the mobility application server 106 can manage packet-switched to packet-switched mobility operations, as well as circuit-switched to packet-switched operations. The mobility application server 106 also may serve as a communication session anchor point for the client device 102.

A SIP proxy server 108 also can be provided for the home communication network 104 to provide internet protocol (IP) registration and call setup on behalf of the client device 102. Moreover, the SIP proxy server 108 can intercept certain messages, such as SIP requests that include a header that indicates the mobility transfer type, as will be described herein. The functionality of the mobility application server 106 and/or the SIP proxy server 108 can be implemented in a single processing device, or implemented among two or more processing devices.

The home communication network 104 may be communicatively linked to a plurality of other communication networks 110, 112, 114. One or more of the communication networks 110, 112, 114 can be radio access networks, packet-switched networks, circuit-switched networks, or the like. For example, each of the communication networks 110, 112, 114 can be radio access networks. Alternatively, a public switched telephone network (PSTN), an integrated services digital network (ISDN) and/or a fiber distributed data interface (FDDI) can be implemented in lieu of one or more of the communication networks 110, 112, 114. Moreover, any number of intermediary networks may be implemented to support communication between the home communication network 104 and the communication networks 110, 112, 114. For example, the home communication network 104 can be communicatively linked to the communication networks 110, 112, 114 via the Internet, one or more backbones, a PSTN, an ISDN, a FDDI, or the like.

In an initial operation state, a communication session can be established between the client device 102 and another communication device 116. The communication session can be supported via a first communication segment 118 established between the client device 102 and the home communication network 104 via the communication network 110. The communication network 110 can be a communication network with which the client device 102 has established a SIP dialog. All messages communicated to and from the client device 102 in the communication session can be routed via the SIP proxy server 108, as is known to those skilled in the art.

As used herein, a "communication segment" is a communication signaling path of a communication session that is established between a client device and a mobility application server 106. In that regard, a communication segment can comprise a contiguous sequence of one or more SIP dialogs and/or circuit-switched connections. As used herein, a SIP dialog is a peer-to-peer relationship between two user agents, for example a user agent of the client device 102 and a user agent of the mobility application server 106. If there are other application servers (not shown) within the home communication network 104 that are linked into the communication segment 118, then the communication segment 118 may include a sequence of dialogs.

During the communication session, the communication device 116 may be communicatively linked to the client device's home communication network 104, and thus to the client device 102, via the communication network 114. Alternatively, the communication device 116 can be directly linked to the home communication network 104, linked via the communication network 110 or the communication network 112, or linked to the home communication network 104 in any other suitable manner.

At some point during the communication session, the client device 102 may roam from the communication network 110 to another communication network 112. Such roaming can be in response to the client device 102 being physically moved, a user input, discovery of the communication network 112, or for any other suitable reason. To establish presence on the communication network 112, the client device 102 can generate a SIP INVITE request 120 that includes a header comprising an indicator of a mobility transfer type, for instance as a private header or as another type of header which can be configured to indicate a mobility transfer type. Optionally, the SIP INVITE request 120 also can include one or more information parameters, for instance within a body of the SIP INVITE request 120. The information parameters can describe characteristics of a second communication segment 122 to be established between the client device 102 and the home communication network 104 via the communication network 112. The client device 102 can receive such information from the communication network 112, for instance in an advertisement generated by the communication network 112.

By way of example, if both the first communication network 110 and the second communication network 112 are administered using the same protocol, for instance each of the communication networks 110, 112 are packet-switched networks, the indicator can be a session mobility indicator. The session mobility indicator can indicate that the client device 102 is handing off from a first communication network to a second similarly configured communication network.

In contrast, if the first communication network 110 and the second communication network 112 implement differing communication protocols, for instance one of the communication networks 110, 112 is a packet-switched network and the other is a circuit-switched network, the indicator can be a voice call continuity transfer indicator. The voice call continuity transfer indicator can indicate that the client device 102 is transferring from a first communication network administered under a first protocol to a second communication network administered under a different protocol.

The mobility transfer type indicator can be presented in the header in any suitable manner. For instance, one or more alphanumeric characters that are unique or that represent a unique sequence can be used as a parameter to represent each mobility transfer type. In example, the numeral "1" can be assigned as a parameter that indicates a session mobility, and the numeral "2" can be assigned as a parameter that indicates a voice call continuity transfer. Similarly, the numeral "3" can be assigned as a parameter that indicates an inter-device transfer, which will be described in further detail with reference to FIG. 2. Nonetheless, any other indicators can be used and the invention is not limited in this regard.

An example of a header that includes a mobility transfer type indicator may be represented as follows:

P-Mobility: transfer; cause=1; text="Voice Call Continuity Transfer"

In this example, the parameter "P-Mobility" can indicate that the header is a private header named "P-Mobility," the parameter "transfer" can be a header value that indicates that the SIP request to which the header corresponds was generated as part of a transfer process, and the term "cause=1" can indicate that the mobility transfer type indicator is represented by the parameter "1." The term "text"='Voice call continuity transfer' optionally may be included to provide descriptive text corresponding to the mobility transfer type indicator.

Another example header that includes a mobility transfer type indicator may be represented as follows:

P-Mobility: transfer; cause=2, transfer; cause=3; text="Inter-Device Session Mobility Transfer"

In this example, the mobility transfer type indicator is represented by the terms "2" and "3," for instance to indicate an inter-device session mobility transfer.

The SIP INVITE request 120 can be sent from the client device 102 via the second communication segment 122 established between the client device 102 and the home communication network 104 via the communication network 112. The SIP INVITE request 120 can be addressed to the communication device 116 or to the home communication network 104. If the SIP INVITE request 120 is addressed to the communication device 116, the address of the mobility application server 106 need not be indicated within the SIP INVITE request 120 because, regardless where the SIP INVITE request 120 is sent, the SIP proxy server 108 can intercept the SIP INVITE request 120 and forward the SIP INVITE request 120 to the mobility application server 106. For example, the SIP proxy server 108 can include an algorithm that identifies SIP messages that have headers that comprise a mobility transfer type indicator, and forward all such messages to the mobility application server 106. Suitable processes and/or queries can be used by the SIP proxy server 108 to identify the mobility application server 106 based on a user subscription associated with the client device 102.

When, or sometime after, sending the SIP INVITE request 120, the client device 102 also can generate a SIP BYE request 124 that also includes the mobility transfer type indicator. The client device 102 then can send the SIP BYE request 124 via the communication segment 118 to trigger release of the communication segment 118. The SIP BYE request 124 can be addressed to the communication device 116 or to the home communication network 104.

In response to receiving the SIP INVITE request 120, the mobility application server 106 can determine whether the SIP INVITE request 120 comprises a mobility transfer type indicator. Presence of the mobility transfer type indicator can indicate to the mobility application server 106 that a mobility transfer operation is taking place with an established communication session with which the SIP INVITE request 120 is associated, and thus to establish the second communication segment 122 as a new communication segment for the communication session in which the SIP INVITE request 120 is associated.

In addition, if the SIP INVITE request 120 includes the mobility transfer type indicator, the mobility application server 106 can generate a SIP re-INVITE request 126 and send the SIP re-INVITE request 126 to the communication device 116. The SIP re-INVITE request 126 can identify at least one characteristic associated with a second communication segment 122 that is different than a corresponding characteristic associated with the first communication segment 118. Such characteristic can be based on information about the communication network 112 received in the SIP INVITE request 120, or based on information otherwise conveyed to the mobility application server 106. Other information pertaining to the communication session also may be included in the SIP re-INVITE request 126.

If the mobility application server 106 also receives the SIP BYE request 124 generated by the client device 102 and communicated via the communication segment 118, the mobility application server 106 need not generate its own SIP BYE request to release the communication segment 118. Moreover, if the SIP INVITE request 120 does not include the mobility transfer type indicator, the mobility application server 106 need not generate a SIP BYE request since a transfer of the communication session is not being indicated within the SIP INVITE request 120.

If, however, the mobility application server 106 does not receive the SIP BYE request 124 when the SIP INVITE request 120 is received, or immediately thereafter, and the SIP INVITE request 120 does include a mobility type indicator, the mobility application server 106 can parse the mobility transfer type indicator from the SIP INVITE request 120 and generate a SIP BYE request 128. The SIP BYE request 128 can include a header comprising the mobility transfer type indicator, for instance as a private header, as a reason header or as another type of header which can be configured to indicate a mobility transfer. The mobility application server 106 can send the SIP BYE request 128 to the client device 102 via the first communication segment 118 established via the communication network 110, which can trigger the mobility application server 106 to release the first communication segment 118.

If the client device 102 receives the SIP BYE request 128 and determines that the SIP BYE request 128 is associated with the communication session for which the SIP INVITE request 120 was associated, but the client device has already sent the SIP BYE request 124, the client device 102 need not perform any further processing of the SIP BYE request 128. If, however, the client device 102 has not yet sent the SIP BYE request 124, receipt of the SIP BYE request 128 can indicate to the client device 102 that the SIP BYE request 124 may no longer be needed to release the communication segment 118.

Similarly, if the mobility application server 106 receives the SIP BYE request 124 and determines that the SIP BYE request 124 is associated with the communication session with which the SIP INVITE request 120 was associated, the mobility application server 106 can determine whether the SIP BYE request 124 includes a mobility transfer type indicator. If the mobility application server 106 identifies a mobility type transfer indicator within the SIP BYE request 124, the mobility application server 106 can determine that the SIP BYE request 124 is being communicated to release the communication segment 118 rather than to end the communication session, and thus take no further action in response to the SIP BYE request 124.

If, however, the mobility application server 106 receives from the client device 102 a SIP BYE request that does not include a mobility type transfer indicator, the mobility application server 106 can interpret such SIP BYE request as a request from the client device 102 to terminate the communication session. In response, the mobility application server 106 can terminate the communication session by releasing all communication segments supporting the communication session.

Notably, the ability of the client device 102 to send the SIP BYE request 124 when the SIP BYE request 128 is not received enables the client device 102 to efficiently release the first communication segment 118, even when communication with the communication network 110 is lost. Moreover, the inclusion of the mobility transfer type indicator within the SIP BYE request 124 can prevent the mobility application server 106 from releasing one or more other communication segments that may be in use in the communication session.

Figure 2:
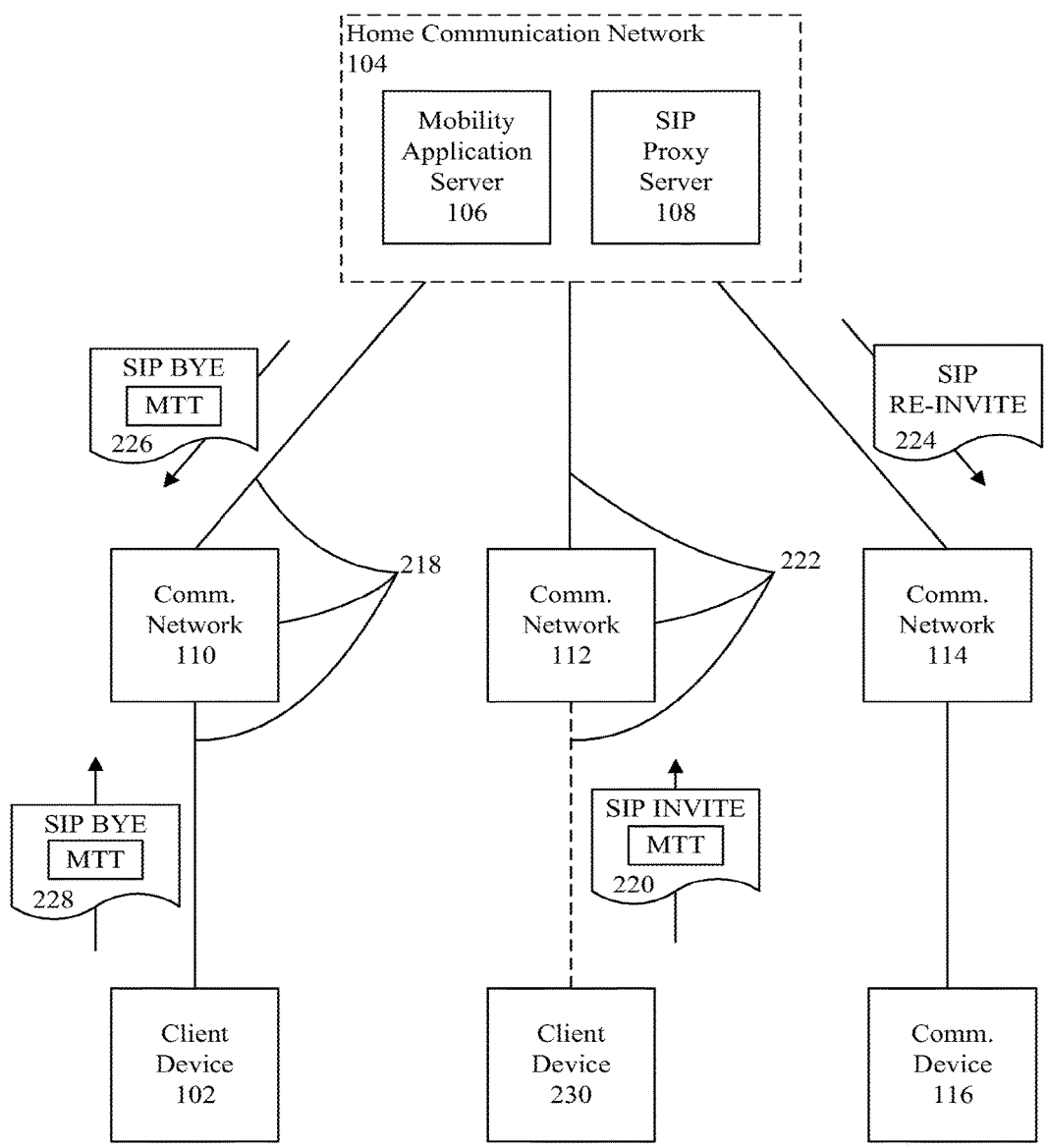
FIG. 2 depicts another communication system that is useful for understanding the present invention.

FIG. 2 depicts a communication system 200 useful for understanding arrangements in which an inter-device transfer may be implemented. An inter-device transfer is the transfer of a communication session from a first client device to a second client device. In one arrangement, an inter-device transfer can be implemented in addition to a voice call continuity transfer or session mobility.

The communication system 200 can include the client device 102, the home communication network 104, the mobility application server 106, the SIP proxy server 108, and the communication networks 110, 114. Optionally, the communication system 200 also can include the communication network 112. In addition, the communication system 200 can comprise a client device 230. The client device 230 can be a mobile communication device, or may be a communication device that is not typically mobile. For example, the client device 230 can be a computer, a telephone, an audio/video system, or the like. The client device 230 can be communicatively linked to the home communication network 104 via the communication network 112. Alternatively, the client device 230 can be communicatively linked to the home communication network 104 via the communication network 110, the communication network 114, or linked in any other suitable manner.

In an initial operation state, a communication session can be established between the client device 102 and another communication device 116. The communication session can be supported via a first communication segment 218 established between the client device 102 and the home communication network 104 via the communication network 110.

At some point during the communication session, a determination can be made to perform an inter-device transfer of the communication session to the client device 230. Such transfer can be initiated in response to a user command entered into the client device 102 and/or the client device 230, in response to detection of the client device 102 being in proximity to the client device 230, or vice versa, or in response to any other applicable circumstances.

When the inter-device transfer is initiated, the client device 230 can send a SIP INVITE request 220 via a second communication segment 222 established between the client device 230 and the home communication network 104 via the communication network 112 (or another communication network with which the client device 230 is communicatively linked). The SIP INVITE request 220 can include a mobility transfer type indicator, which can indicate that an inter-device transfer is taking place.

In addition, the mobility transfer type indicator can indicate a voice call continuity transfer or session mobility, if applicable, that is being implemented as part of the inter-device transfer process. For instance, if the communication networks 110, 112 both are administered under the same protocol, the mobility transfer type indicator can indicate that both inter-device transfer and session mobility are taking place. If the communication networks 110, 112 are administered under different protocols, the mobility transfer type indicator can indicate that inter-device transfer and voice call continuity transfer are taking place.

If the SIP INVITE request 220 is addressed to the communication device 116, the address of the mobility application server 104 need not be indicated within the SIP INVITE request 220 since the SIP INVITE request 220 can be intercepted by the SIP proxy server 108 and forwarded to the mobility application server 106, as previously described. The mobility application server 106 can determine whether the SIP INVITE request 220 comprises a mobility transfer type indicator and, if so, establish the second communication segment 222 as a new communication segment for the communication session for which the SIP INVITE request 220 was sent. The mobility application server 106 also can release one or more previous communication segments associated with the communication session, such as the first communication segment 218.

In addition, the mobility application server 106 can generate a SIP re-INVITE request 224 and send the SIP re-INVITE request 224 to the communication device 116. The mobility application server 106 also can generate a SIP BYE request 226 comprising the mobility type indicator and send the SIP BYE request 226 to the client device 102. The SIP re-INVITE request 224 and the SIP BYE request 226 can be generated, sent and processed by the various system components as previously described for the SIP re-INVITE request 126 and the SIP BYE request 128 of FIG. 1.

For example, the client device 102 can determine whether the SIP BYE request 226 includes a mobility transfer type indicator. If so, the client device 102 need not take any further action to release the first communication segment 218. In some circumstances the client device 102 may not receive the SIP BYE request 226, but can be configured to send the SIP BYE request 228 in response to a particular event. For example, the client device 102 can generate and send the SIP BYE request 228 in response to a user action taken on the client device's user interface, after detecting that a period of time has elapsed since detecting the client device 230, or based upon any other suitable event.

Figure 3:
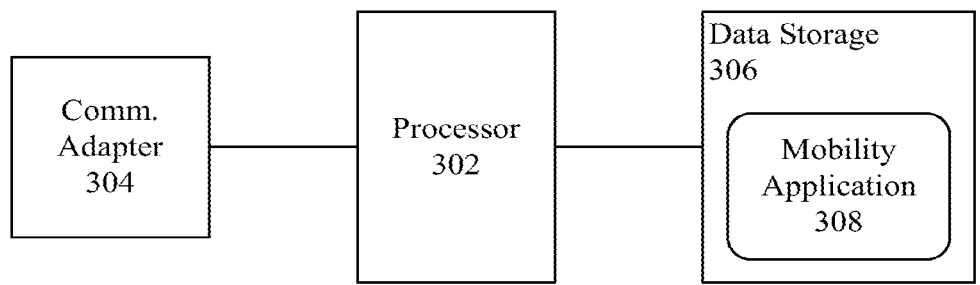
FIG. 3 is a block diagram of a mobility application server that is useful for understanding the present invention.

FIG. 3 is a block diagram depicting one example of the mobility application server 106 that is useful for understanding the present invention. The mobility application server 106 can include a processor 302, which may comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The mobility application server 106 also can include, or be coupled to, a communication adapter 304. The communication adapter 304 can be any data send/receive device that is suitable for communicating via a communications network. For example, the communication adapter 304 can be a transceiver that is configured to wirelessly communicate via a base transceiver station, a repeater, an access point, or any other suitable wireless network device. In another arrangement, the communication adapter 304 can be a wired communication port or a network adapter configured to communicate via wired communication, for instance via a switch or a router. The communication adapter 304 can communicate data via GSM, TDMA, CDMA, WCDMA, OFDM, direct wireless communication, TCP/IP and/or any other suitable communication protocols.

The mobility application server 106 further can include data storage 306. The data storage 306 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 306 can be integrated into the processor 302, though this need not be the case.

At least one mobility application 308 can be stored on the data storage 306 or otherwise made accessible to the processor 302. The mobility application 308 can be executed by the processor 302 to implement the methods and processes described herein that are performed by the mobility application server 106. For example, the processor 302 can execute the mobility application 308 to send and receive SIP requests via the communication adapter 304, process received SIP requests to determine whether such requests comprise mobility transfer type indicators, generate SIP requests in response to such determinations, some of which may include mobility transfer type indicators, and so on. The mobility application 308 also can be executed to perform any other mobility functions, and the invention is not limited in this regard.

Figure 4:
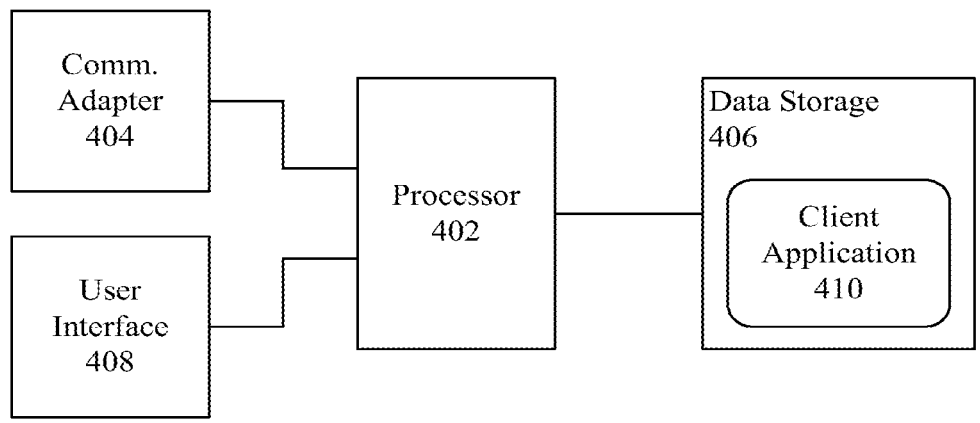
FIG. 4 is a block diagram of a client device that is useful for understanding the present invention.

FIG. 4 is a block diagram of an example of a client device 400 that is useful for understanding the present invention. The client device 400 depicted can be implemented as the client device 102 of FIGS. 1-2 and/or the client device 230 of FIG. 2. The client device 400 can include a processor 402, which may comprise, for example, one or more CPUs, one or more DSPs, one or more ASICs, one or more PLDs, a plurality of discrete components that can cooperate to process data, and/or any other suitable processing device. As noted, in an arrangement in which a plurality of such components are provided, the components can be coupled together to perform various processing functions as described herein.

The client device 400 also can include a communication adapter 404 and a data storage 406. The communication adapter 404 can be any data send/receive device that is suitable for communicating via a wired and/or wireless communications network and the data storage 408 can include one or more storage devices, for example as previously described with respect to FIG. 3.

A user interface 408 also can be included with the client device 400. The user interface can include one or more keys, soft keys, keyboards, buttons, displays, touch screens, indicator lamps, input audio transducers, output audio transducers, pointing devices, haptic devices, or the like. The user interface 408 can receive user inputs and present information to a user in any of a variety of suitable formats.

At least one client application 410 can be stored on the data storage 406 or otherwise made accessible to the processor 402. The client application 410 can be executed by the processor 402 to implement the methods and processes described herein that are performed by one or more of the client devices. For example, the processor 402 can execute the client application 410 to send and receive SIP requests via the communication adapter 404, process received SIP requests to determine whether such requests comprise mobility transfer type indicators, generate SIP requests in response to such determinations, some of which may include mobility transfer type indicators, and so on. The client application 410 also can be executed to perform any other client device functions, and the invention is not limited in this regard.

FIG. 5 is a flowchart presenting a method 500 of supporting a mobility transfer operation. At step 502, a mobility transfer operation that has been initiated can be detected. For example, the mobility transfer operation can be detected on the client device by detecting a decision by the client device to proceed with a mobility transfer. In another example, the mobility application server can detect that a mobility transfer operation has been initiated by receiving from the client device a SIP INVITE request comprising a mobility transfer type indicator. Still, initiation of the mobility transfer operation can be detected in any other suitable manner and the invention is not limited to these examples.

At step 504, a SIP request can be generated that indicates a mobility transfer type that corresponds to the mobility transfer operation. For example, the SIP request can be a SIP INVITE request generated by the client device, and can include a header which includes a mobility transfer type indicator that indicates the type of mobility transfer operation that is being implemented. In another example, the SIP request can be a SIP BYE request generated by the mobility application server, which also can include a header that includes a mobility transfer type indicator. The mobility application server can receive the mobility transfer type indicator from the client device in a SIP INVITE request.

The mobility transfer type indicator can indicate a voice call continuity transfer, a session mobility transfer, an inter-device transfer, and/or any other type of transfer that is being implemented. As noted, the mobility transfer type indicator can identify one or more types of mobility transfer being implemented.

Optionally, the SIP request that is generated by the client device or the mobility application server can comprise at least one information parameter in a body of the SIP request. The information parameter can describe characteristics of the second communication segment to which a communication session is being transferred from a first communication segment.

At step 506, the generated SIP request can be sent from a first device participating in the mobility transfer operation to at least a second device participating in the mobility transfer operation. For example, the client device can send the generated SIP INVITE request to the mobility application server, or the mobility application server can send the generated SIP BYE request to the client device.

FIG. 6 is a flowchart presenting a method 600 of responding to a mobility transfer operation being initiated. At step 602, a SIP request can be received from a device participating in a mobility transfer operation. The SIP request can indicate a mobility transfer type that corresponds to the mobility transfer operation. The SIP request can be, for example, a SIP INVITE request or a SIP BYE request generated by a client device, and such SIP request can include a header that indicates the mobility transfer type. The SIP request generated by the client device can be received by the mobility application server.

In another example, the SIP request can be a SIP BYE request generated by the mobility application server, and such SIP BYE request can include a header that indicates the mobility transfer type. Such SIP BYE request can be received by the client device.

In one arrangement, the SIP request can include one or more information parameters in a body of the SIP request. As noted, such parameters can describe a characteristic of the second communication segment to which a communication session is being transferred from the first communication segment.

At step 604, a process that corresponds to the mobility transfer type can be identified. At step 606, the identified process can be implemented. For instance, if the SIP request is a SIP INVITE request generated by the client device, the mobility application server can establish a second communication segment between the client device and the mobility application server in order to maintain a communication session being transferred to the second communication segment from a first communication segment. The mobility application server also can generate a SIP BYE request that includes a header that indicates the mobility transfer type, and send the SIP BYE request via the first communication segment to the client device and/or a second client device. Further, the mobility application server can generate a SIP re-INVITE request that may identify at least one characteristic associated with a second communication segment that is different than a corresponding characteristic associated with the first communication segment. The mobility application server then can send the SIP re-INVITE request to at least one communication device with which the client device is communicating during the communication session.

In an example in which the SIP request is a SIP BYE request generated by the client device, the mobility application server can release the first communication segment. Similarly, if the SIP request is a SIP BYE request generated by the mobility application server, the client device can release the first communication segment.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The term "application," as well as variants thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of indicating a process to be implemented in support of mobility transfer operations, comprising:
responsive to detecting that a mobility transfer operation has been initiated where a client device has roamed from a first communication network to a second communication network during a communication session, generating a session initiation protocol (SIP) request including a header, wherein a mobility transfer type indicator that identifies a mobility transfer type from a plurality of mobility transfer types is selected for inclusion in the header that corresponds to the mobility transfer operation being performed, wherein the plurality of mobility transfer types includes a voice call continuity transfer type, a session mobility transfer type, and an inter-device transfer type; and sending the SIP request from the client device participating in the mobility transfer operation in order to maintain the communication session being transferred to the second communication network from the first communication network.

2. The method of claim 1, wherein generating the SIP request comprises generating a SIP INVITE request.

3. The method of claim 1, wherein generating the SIP request comprises generating a SIP BYE request.

4. The method of claim 1, wherein the mobility transfer type indicator is selected from one or more characters and wherein each of the one or more characters indicates the mobility transfer operation selected from a group consisting of a voice call continuity transfer, a session mobility transfer, and an inter-device transfer.

5. The method of claim 1, wherein the mobility transfer type indicator is a sequence of characters and wherein the sequence of characters indicates the mobility transfer operation selected from a group consisting of a voice call continuity transfer, a session mobility transfer, and an inter-device transfer.

6. The method of claim 1, wherein the SIP request includes at least one information parameter in the SIP request that describes a characteristic of a second communication segment established via the second communication network that is different than a corresponding characteristic of a first communication segment established via the first communication network.

7. The method of claim 6, wherein the at least one information parameter is included in a body of the SIP request.

8. The method of claim 6, wherein the SIP request is sent to at least a home communication network that includes a mobility application server to request that the second communication segment be established between the client device and the mobility application server.

9. A communication device participating in mobility transfer operations, comprising:
a processor that, responsive to detecting that a mobility transfer operation has been initiated where the communication device has roamed from a first communication network to a second communication network during a communication session, generates a session initiation protocol (SIP) request including a header, wherein a mobility transfer type indicator that identifies a mobility transfer type from a plurality of mobility transfer types is selected for inclusion in the header that corresponds to the mobility transfer operation being performed, wherein the plurality of mobility transfer types includes a voice call continuity transfer type, a session mobility transfer type, and an inter-device transfer type; and
a communication adapter that sends the SIP request from the communication device participating in the mobility transfer operation in order to maintain the communication session being transferred to the second communication network from the first communication network.

10. The communication device of claim 9, wherein the communication device is a client device and wherein the SIP request is a SIP INVITE request.

11. The communication device of claim 9, wherein the communication device is a client device and wherein the SIP request is a SIP BYE request.

12. The communication device of claim 9, wherein the mobility transfer type indicator is selected from one or more characters and wherein each of the one or more characters indicates the mobility transfer operation selected from a group consisting of a voice call continuity transfer, a session mobility transfer, and an inter-device transfer.

13. The communication device of claim 9, wherein the mobility transfer type indicator is a sequence of characters and wherein the sequence of characters indicates the mobility transfer operation selected from a group consisting of a voice call continuity transfer, a session mobility transfer, and an inter-device transfer.

14. The communication device of claim 9, wherein the SIP request includes at least one information parameter in the SIP request that describes a characteristic of a second communication segment established via the second communication network that is different than a corresponding characteristic of a first communication segment established via the first communication network.

15. The communication device of claim 14, wherein the at least one information parameter is included in a body of the SIP request.

16. The communication device of claim 14, wherein the SIP request is sent to at least a home communication network that includes a mobility application server to request that the second communication segment be established between the communication device and the mobility application server.

17. A non-transitory computer-readable medium containing computer executable instructions that, when executed by a processor, cause the processor to perform a method for supporting mobility transfer operations, the method comprising:
responsive to detecting that a mobility transfer operation has been initiated where a client device has roamed from a first communication network to a second communication network during a communication session, generating a session initiation protocol (SIP) request including a header, wherein a mobility transfer type indicator that identifies a mobility transfer type from a plurality of mobility transfer types is selected for inclusion in the header that corresponds to the mobility transfer operation being performed, wherein the plurality of mobility transfer types includes a voice call continuity transfer type, a session mobility transfer type, and an inter-device transfer type; and
sending the SIP request from the client device participating in the mobility transfer operation in order to maintain the communication session being transferred to the second communication network from the first communication network.

\* \* \* \* \*